Feb. 15, 1927.
J. S. LEEDY
1,617,765
CHRISTMAS TREE HOLDER
Filed April 25, 1925
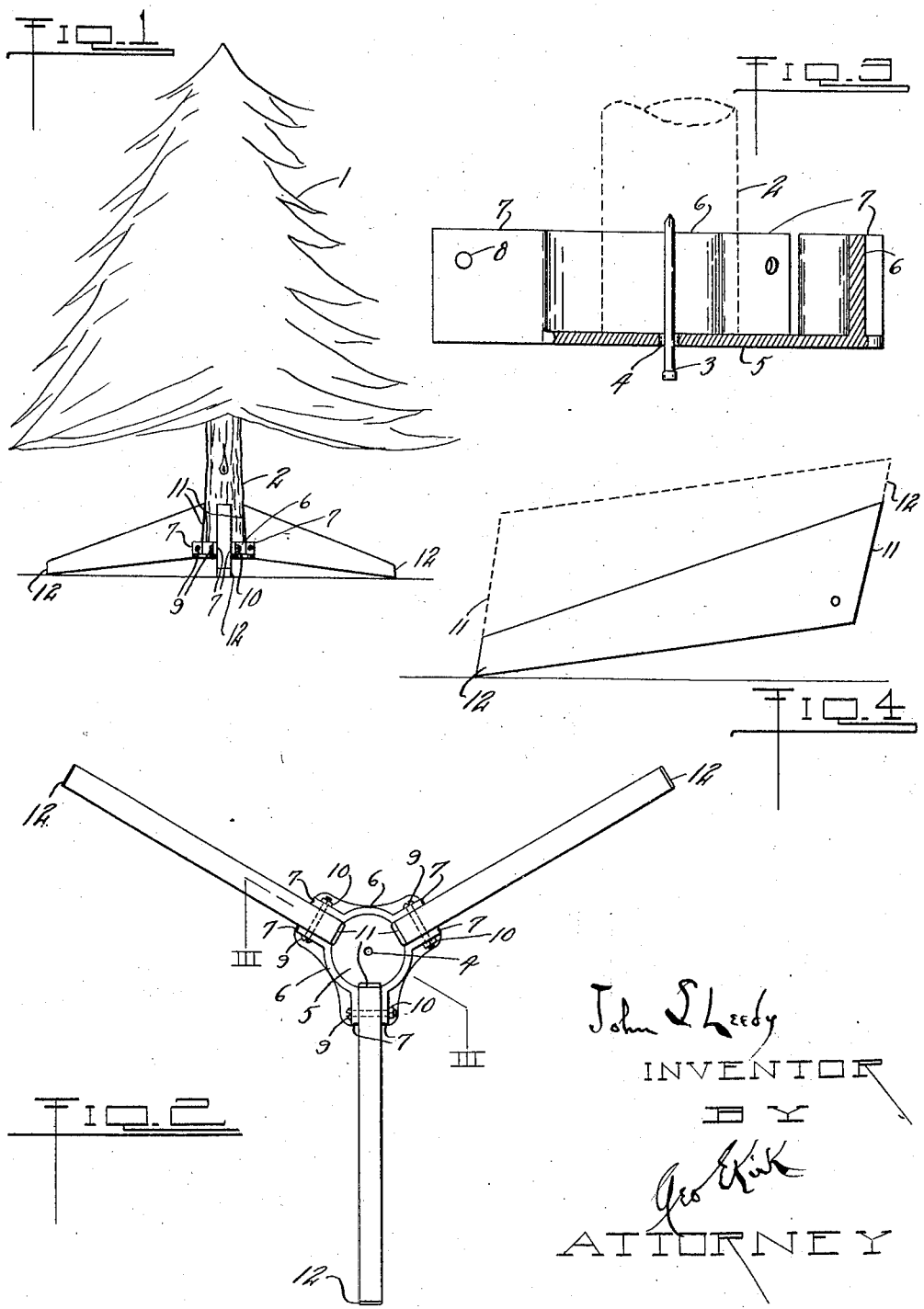
John S Leedy
INVENTOR
BY
Geo E Kirk
ATTORNEY Patented Feb. 15, 1927.

1,617,765

UNITED STATES PATENT OFFICE.

JOHN S. LEEDY, OF MONROE, MICHIGAN.

CHRISTMAS-TREE HOLDER.

Application filed April 25, 1925. Serial No. 25,734.

This invention relates to collapsible clamps of the stand or holder type.

This invention has utility when embodied in a multiple leg holder for Christmas trees.

Referring to the drawings:

Fig. 1 is a view of an embodiment of the holder in set-up position;

Fig. 2 is a plan view of the holder of Fig. 1 with the tree removed;

Fig. 3 is a section on the line III—III, Fig. 2; and

Fig. 4 is a detail view of a lever or leg as coacting with the base or main member of the device of this disclosure.

Tree 1 is shown as having trunk or base 2 into which may be centrally driven a finishing nail 3. This tree trunk or base, whether of a limb or the central portion of the tree to carry the Christmas tree member 1, may be settled through opening 4, in main base plate 5. This plate 5 is shown as having upstanding therefrom annular flange 6 herein shown as in sections terminating in outwardly extending ears 7. These ears 7 are in pairs and have openings 8 for bolts 9, as fulcrum pins, on which may be threaded nuts 10 for drawing the ears 7 toward each other in a clamping fulcrum for leg providing levers herein shown as having short upwardly projecting arms 11 and long outwardly and slightly downwardly extending arms with feet or leg portions 12. The cast metal of these ears is sufficiently light gauge to permit of slight clamping action brought about by the bolts 9.

As the squared off terminus of the branch or trunk 2 is settled down upon the plate 5 with the central nail, as pin 3, passing through the opening 4, this loading or weight tends to swing the levers as having arms 12 coacting with the floor, to throw the short clamping arm portions 11 into converging relation above the plate 5 and toward the central opening 4, thus into gripping or clamping relation with the tree trunk 2. The load as now settling on the feet or legs of this holder, stand, or support having the outwardly extending arms 12, work at a mechanical advantage for not only gripping the trunk or stem of the article to be held above the plate 5, but so grip such tree as to maintain it substantially in upright position centered nicely as to the support herein shown as a three-legged structure.

The central plate or base with its flanges and ear means is desirably of a unitary structure herein being shown of cast metal. The levers 11, 12, are herein shown as wood which may economically be cut from stock of rhomboid form with the pieces alternated or complementary as each a semi-rhomboid quadrilateral, one as to the other, as shown in dotted lines in Fig. 4. This means there is efficient economical production of the legs of the tree while the main support or base member is of simple form and of substantial construction.

What is claimed and it is desired to secure by United States Letters Patent is:

A tree holder base comprising a flat plate section for extension horizontally from a central opening as a guide for a pin to engage a tree to be seated on said plate section, flange sections integral with and abruptly upwardly extending about said plate section, said flange sections terminating in outwardly extending ears in parallel pairs above the plane of said plate section and reinforced by said flange sections, pins through the ears, and support providing levers fulcrumed on said pins and extending upwardly between the ears to be rocked by the outwardly extending lower portions of said levers to be effective for centering in clamping position a tree to be sustained on said plate.

In witness whereof I affix my signature.

JOHN S. LEEDY.